(12) United States Patent
Lin et al.

(10) Patent No.: US 11,074,108 B2
(45) Date of Patent: Jul. 27, 2021

(54) CACHING ELECTRONIC CONTROL UNIT MAPPING SOLUTIONS FOR CONNECTED VEHICLES

(71) Applicant: TOYOTA JIDOSHA KABUSHIKI KAISHA, Toyota (JP)

(72) Inventors: Chung-Wei Lin, Sunnyvale, CA (US); BaekGyu Kim, Cupertino, CA (US); Shinichi Shiraishi, San Jose, CA (US)

( * ) Notice: Subject to any disclaimer, the term of this patent is extended or adjusted under 35 U.S.C. 154(b) by 119 days.

(21) Appl. No.: 15/162,354

(22) Filed: May 23, 2016

(65) Prior Publication Data

US 2017/0336802 A1    Nov. 23, 2017

(51) Int. Cl.
*G06F 9/50* (2006.01)
*G06F 8/65* (2018.01)

(52) U.S. Cl.
CPC . *G06F 9/50* (2013.01); *G06F 8/65* (2013.01)

(58) Field of Classification Search
None
See application file for complete search history.

(56) References Cited

U.S. PATENT DOCUMENTS

| | | | |
|---|---|---|---|
| 9,791,864 B2 | 10/2017 | Lei et al. | |
| 9,824,283 B2 | 11/2017 | Koo | |
| 9,867,118 B2 | 1/2018 | Silver | |
| 9,916,496 B2 | 3/2018 | Vandonkelaar | |
| 9,919,715 B2* | 3/2018 | Tseng | B60K 35/00 |
| 9,969,320 B2 | 5/2018 | Kim et al. | |
| 2003/0182425 A1* | 9/2003 | Kurakake | H04L 67/1002 709/226 |
| 2004/0088412 A1 | 5/2004 | John et al. | |
| 2014/0350749 A1* | 11/2014 | Kwak | B60R 16/0231 701/2 |
| 2015/0100504 A1 | 4/2015 | Binion et al. | |
| 2016/0285992 A1* | 9/2016 | Katsev | H04L 67/2842 |

(Continued)

OTHER PUBLICATIONS

Alexander Metzner, et al., "RTSAT—An Optimal and Efficient Approach to the Task Allocation Problem in Distributed Architectures," Proceedings of the 27th IEEE International Real-Time Systems Symposium (RTSS'06), 2006.

(Continued)

*Primary Examiner* — Donald J Wallace
(74) *Attorney, Agent, or Firm* — Burbage Law, P.C.; Jon-Michael Burbage; Elizabeth Ruzich

(57) ABSTRACT

The disclosure includes implementations for a connected vehicle receiving cached electronic control unit ("ECU" if singular or "ECUs" if plural) mapping solutions via a network. Some implementations of a method for a vehicle may include identifying a presence of one or more functions associated with a vehicle control system. The method may include generating a query including a mapping problem describing one or more questions about which of one or more ECUs should execute the one or more functions. The method may include providing the query to a network. The method may include receiving a response from the network. The response may include a mapping solution that describes which of the one or more ECUs should execute the one or more functions. The method may include mapping the one or more functions to the one or more ECUs as described by the mapping solution.

20 Claims, 7 Drawing Sheets

(56) References Cited

U.S. PATENT DOCUMENTS

2017/0010588 A1\* 1/2017 Porembski et al. ... G05B 11/01
2017/0174180 A1 6/2017 Hoyos et al.

OTHER PUBLICATIONS

Wei Zheng, et al., "Definition of Task Allocation and Priority Assignment in Hard Real-Time Distributed Systems," 28th IEEE International Real-Time Systems Symposium, pp. 161-170, 2007.
Iain Bate, et al., "Incorporating Scenarios and Heuristics to Improve Flexibility in Real-Time Embedded Systems," Proceedings of the 27th IEEE International Real-Time Systems Symposium (RTSS'06), 2006.
USPTO, Non-final Office Action for U.S. Appl. No. 15/173,958, dated Jun. 15, 2018, 35 pages.
USPTO, Notice of Allowance for U.S. Appl. No. 15/173,958, dated Jan. 30, 2019, 8 pages.

\* cited by examiner

CACHING ELECTRONIC CONTROL UNIT MAPPING SOLUTIONS FOR CONNECTED VEHICLES

BACKGROUND

The specification relates to caching electronic control unit ("ECU") mapping solutions for one or more connected vehicles.

It is expected that many software functions can be downloaded, updated, and customized in future automotive systems. Each function may be executed one or more ECUs. The process to decide how to distribute functions to be executed by ECUs is called a "mapping process" or a "mapping solution." The mapping process should satisfy system requirements such as ECU utilization and real-time deadline and optimize certain objectives such as performance and precision.

SUMMARY

Described are implementations that include a system, method and computer program product for caching mapping solutions for one or more connected vehicles. The mapping solutions may be cached on a cloud server. The connected vehicle may wirelessly transmit a query message including query for a mapping solution to a network. The cloud server may receive the query. The cloud server may retrieve a mapping solution responsive to the query from a cache. The cloud server may wirelessly transmit a response message including the mapping solution that is responsive to the query. The connected vehicle may receive the response message. The connected vehicle may decide how one or more functions will be executed based on the mapping solution including in the response message.

In some implementations, the mapping solution may be configured to satisfy system requirements such as ECU utilization and a real-time deadline.

In some implementations, the mapping solution may be configured to optimize certain objectives such as vehicle or engine performance and precision.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a system including: a mapping client of a vehicle that is operable to generate a query including mapping problem data describing a mapping problem including one or more questions about which of one or more electronic control units should execute one or more functions, where the mapping client is communicatively coupled to a network and transmits the query to the network; and a mapping optimizer of a mapping server that is communicatively coupled to the network and operable to receive the query including the mapping problem data and retrieve mapping solution data describing a mapping solution for the mapping problem described by the mapping problem data; where the mapping solution describes which of the one or more electronic control units should execute the one or more functions; where the mapping optimizer is communicatively coupled to a cache that includes a non-transitory memory; where the mapping problem was previously solved by the mapping optimizer prior to receipt of the query and the mapping solution data that solves the mapping problem was previously stored in the cache; where, responsive to receipt of the query, the mapping optimizer is operable to (1) analyze the mapping problem data included in the query to determine that the mapping problem described by the mapping problem data was previously solved by the mapping optimizer, (2) retrieve the mapping solution data from the cache, (3) generate a response that includes the mapping solution data and (4) transmit the response to the network; and where the mapping client of the vehicle receives the response from the network and maps the one or more functions to the one or more electronic control units as described by the mapping solution. Other embodiments of this aspect include corresponding computer systems, apparatus, and computer programs recorded on one or more computer storage devices, each configured to perform the actions of the methods.

One general aspect includes a system including: a mapping client of a vehicle that is operable to generate a query including mapping problem data describing a mapping problem including one or more questions about which of one or more electronic control units should execute one or more functions, where the mapping client is communicatively coupled to a network and transmits the query to the network; and a mapping optimizer of a mapping server that is communicatively coupled to the network and operable to receive the query including the mapping problem data and generate mapping solution data describing a mapping solution for the mapping problem described by the mapping problem data, where the mapping optimizer generates a response that includes the mapping solution data and transmits the response to the network; where the mapping solution describes which of the one or more electronic control units should execute the one or more functions; and where the mapping client of the vehicle receives the response from the network and maps the one or more functions to the one or more electronic control units as described by the mapping solution. Other embodiments of this aspect include corresponding computer systems, apparatus, and computer programs recorded on one or more computer storage devices, each configured to perform the actions of the methods.

Implementations may include one or more of the following features. The system where the vehicle is an autonomous vehicle and the one or more functions are associated with a vehicle control system that makes the vehicle autonomous. The system where the vehicle includes an Advanced Driver Assistance System and the one or more functions are associated with the Advanced Driver Assistance System. The system where the server is an element of a roadside unit. The system where the response is received by the mapping client in substantially real time relative to when the query was transmitted to the network by the mapping client. The system where the mapping optimizer previously solved the mapping problem prior to receipt of the query. The system where prior to receipt of the query the mapping optimizer stored the mapping problem data in a cache that includes a non-transitory memory. The system where responsive to receipt of the query the mapping optimizer generates the mapping problem data by retrieving the mapping problem data from the cache. Implementations of the described techniques may include hardware, a method or process, or computer software on a computer-accessible medium.

One general aspect includes a computer program product including a non-transitory memory of a vehicle storing computer-executable code that, when executed by a processor of the vehicle, causes the processor to: identify a presence of one or more functions associated with a vehicle control system; generate a query including mapping problem data describing a mapping problem including one or more questions about which of one or more electronic control units should execute the one or more functions; provide the query to a network; receive a response from the network, where the response includes mapping solution data describing a mapping solution for the mapping problem, where the mapping solution describes which of the one or more electronic control units should execute the one or more functions; and map the one or more functions to the one or more electronic control units as described by the mapping solution. Other embodiments of this aspect include corresponding computer systems, apparatus, and computer programs recorded on one or more computer storage devices, each configured to perform the actions of the methods.

Implementations may include one or more of the following features. The computer program product where the response including the mapping solution data is transmitted to the vehicle by a server that is communicatively coupled to the network. The computer program product where the vehicle is an autonomous vehicle and the vehicle control system includes software that makes the vehicle autonomous. The computer program product where the vehicle control system includes an Advanced Driver Assistance System. The computer program product where the response is received by the vehicle in substantially real time relative to when the query was transmitted to the network. The computer program product where the response is received by the vehicle in substantially real time relative to when the presence of the one or more functions associated with a vehicle control system were identified. Implementations of the described techniques may include hardware, a method or process, or computer software on a computer-accessible medium.

One general aspect includes a method of a vehicle including: identifying a presence of one or more functions associated with a vehicle control system; generating, by a processor of an onboard vehicle computer of the vehicle, a query including mapping problem data describing a mapping problem including one or more questions about which of one or more electronic control units should execute the one or more functions; providing the query to a network; receiving a response from the network, where the response includes mapping solution data describing a mapping solution for the mapping problem, where the mapping solution describes which of the one or more electronic control units should execute the one or more functions; and mapping the one or more functions to the one or more electronic control units as described by the mapping solution. Other embodiments of this aspect include corresponding computer systems, apparatus, and computer programs recorded on one or more computer storage devices, each configured to perform the actions of the methods.

Implementations may include one or more of the following features. The method where the response including the mapping solution data is transmitted to the vehicle by a server that is communicatively coupled to the network. The method where the vehicle is an autonomous vehicle and the vehicle control system includes software that makes the vehicle autonomous. The method where the vehicle control system includes an Advanced Driver Assistance System. The method where the response is received by the vehicle within five seconds relative to when the presence of the one or more functions associated with a vehicle control system were identified. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
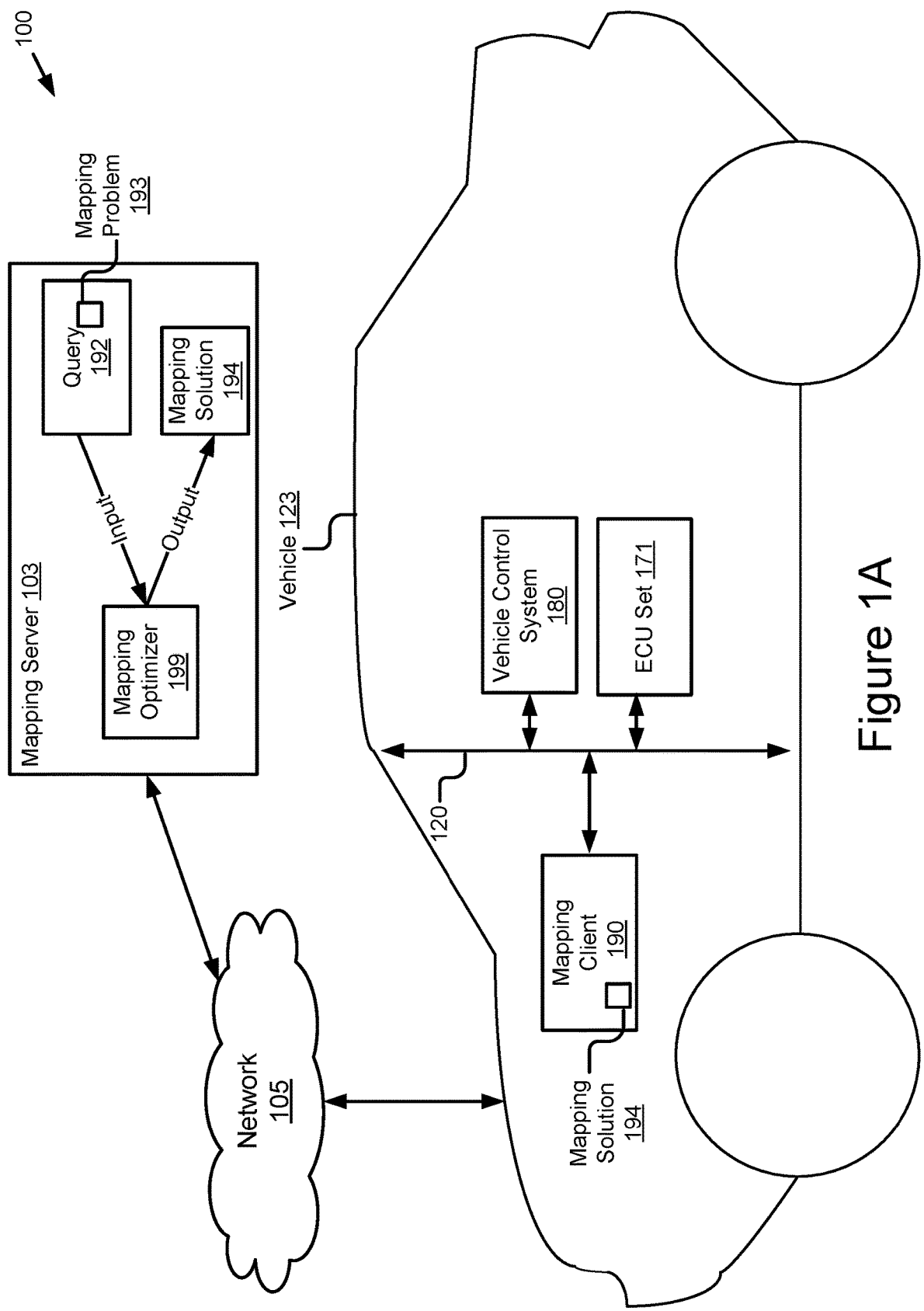
FIG. 1A is a block diagram illustrating an operating environment for a mapping optimizer and a mapping client according to some implementations.

In the past, mapping problems for vehicle Electronic Control Units ("ECU" if singular or "ECUs" if plural) have been solved offline. This was possible because there were not too many functions and these functions are not changed or updated. In the future it will not be possible to determine mapping solutions offline due to increased use of vehicle control systems.

A vehicle control system includes, for example, (1) the software and hardware that makes a vehicle autonomous or (2) an Advanced Driver Assistance System (herein, an "ADAS system").

Examples of an ADAS system may include one or more of the following elements of a vehicle 123: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

A vehicle that includes a vehicle control system has different requirements for mapping solutions than vehicles that do not include a vehicle control system. Relative to vehicles that do not include a vehicle control system, vehicles that include vehicle control systems experience one or more of the following: (1) an increase in combinations of different functions that must be executed by one or more ECUs; (2) different versions of functions that must be executed by one or more ECUs; and (3) different settings of functions that must be executed by one or more ECUs.

Furthermore, these combinations, versions and settings may be changed or updated frequently. The cumulative result of these vehicle control systems is an increased demand for mapping solutions and an increased complexity in mapping problems which cannot be solved offline.

Research on the effects of vehicle control systems on future vehicles has shown that it would only be possible to solve the resulting mapping problems using a far more powerful computation unit than is presently installed in existing vehicles. Sufficiently powerful computation units may exist. However, our research shows that it is not economically feasible to install these computation units in vehicles. Accordingly, our research indicates that vehicles themselves are not likely to have sufficiently powerful computation units to solve the mapping problems that they are likely to experience due to increased use of vehicle control systems.

Implementations described herein include a mapping system that is capable of solving the problem described above for connected vehicles.

In some implementations, the mapping system may include one or more of the following: (1) a mapping client present in a connected vehicle; and (2) a mapping optimizer present in a cloud server.

In some implementations, the mapping system may solve one or more mapping problems online. For example, the mapping system may solve a mapping problem after one or more functions, versions or settings have been changed or updated (thereby resulting in the mapping problem).

In some implementations, the mapping client may communicate with a cloud server (having greater computational power than the components of the vehicle itself) via a network. The mapping optimizer of the cloud server may assist the mapping client to solve mapping problems.

In some implementations, the mapping system may determine mapping solutions for the mapping problems in real time or substantially real time. For example, a mapping solution for a mapping problem may be determined in real time (or substantially in real time) after one or more functions, version or settings have been changed or updated.

In some implementations, the mapping optimizer may cache mapping solutions so that they may be re-used in the future.

FIG. 1A is a block diagram illustrating an operating environment 100 for a mapping optimizer 199 and a mapping client 190 according to some implementations.

The operating environment 100 may include one or more of the following elements: a vehicle 123; and a mapping server 103. These elements of the operating environment 100 may be communicatively coupled to one another via a network 105.

The vehicle 123 may include a car, a truck, a sports utility vehicle, a bus, a semi-truck, a drone or any other roadway-based conveyance that includes a vehicle control system 180.

In some implementations, the vehicle 123 may include an autonomous vehicle or a semi-autonomous vehicle.

In some implementations, the vehicle 123 is a connected vehicle. For example, the vehicle 123 is communicatively coupled to the network 105 and can send and receive messages via the network 105.

The vehicle 123 may include one or more of the following elements: a mapping client 190; a vehicle control system 180 and an ECU set 171. These elements may be communicatively coupled to one another via a bus 120.

In some implementations, the vehicle 123 may further include a non-transitory memory (not pictured; similar to the memory 227 or the storage 241 described below with reference to FIG. 2A) that stores the mapping solution 194 and any other data necessary for the mapping client 190 or the mapping optimizer 199 to provide its functionality.

In some implementations, the vehicle 123 may further include an onboard vehicle computer. For example, the onboard vehicle computer may include one or more processors (not pictured; similar to the processor 225 described below with reference to FIG. 2A) that execute or control the execution of the mapping client 190.

In some implementations, the mapping client 190 may be communicatively coupled to the bus 120.

In some implementations, the mapping client 190 may be implemented using hardware including a field-programmable gate array ("FPGA") or an application-specific integrated circuit ("ASIC"). In some other implementations, the mapping client 190 may be implemented using a combination of hardware and software. The mapping client 190 may be stored in a combination of the devices (e.g., servers or other devices), or in one of the devices.

The mapping client is described in more detail below with reference to FIGS. 1B, 2A, 2B, 3, 4A and 4B.

The vehicle control system 180 may include an ADAS system of the vehicle 123. In some implementations, the vehicle control system 180 may include the software or hardware that causes the vehicle 123 to be an autonomous vehicle or semi-autonomous vehicle.

In some implementations, the vehicle control system 180 may be communicatively coupled to the bus 120.

The ECU set 171 may include one or more ECUs. In some implementations, one or more of the ECUs of the ECU set 171 may include an engine control unit or any other electronic control unit that is conventional to a vehicle 123. One or more of the ECUs of the ECU set 171 may include an onboard vehicle computer.

In some implementations, the ECU set 171 may be communicatively coupled to the bus 120. For example, one or more of the ECUs of the ECU set 171 may be communicatively coupled to the bus 120 either directly or indirectly.

The vehicle 123 may include network communication capabilities. For example, the vehicle may include hardware or software necessary to send and receive messages via the network 105. In some implementations the vehicle 123 may include a communication unit 245 as described below with reference to FIG. 2A.

The vehicle 123 may be communicatively coupled to the network 105. The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some implementations, the network 105 may include a peer-to-peer network. The network 105 may also be coupled to or may include portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include third-generation (3G), fourth-generation (4G), long-term evolution (LTE), Voiceover-LTE ("VoLTE") or any other mobile data network or combination of mobile data networks. Further, the network 105 may include one or more IEEE 802.11 wireless networks. The network 105 may include a Wi-Fi™ network.

The mapping server 103 may include a hardware server. The mapping server 103 may be communicatively coupled to the network 105. The mapping server 103 may include network communication capabilities. The mapping server 103 may be operable to send and receive messages via the network 105.

The mapping server 103 may include a mapping optimizer 199. In some implementations, the mapping server 103 may receive a query 192. The query 192 may include an electronic message that includes electronic data describing a mapping problem 193 for the vehicle 123. The vehicle 123 may have transmitted the query 192 responsive to the mapping client 190 identifying the mapping problem 193.

In some implementations, the mapping optimizer 199 may include code and routines that are operable to receive the query 192 or the mapping problem 193 as an input and output a mapping solution 194. The mapping solution 194 may describe a solution to the mapping problem 193.

In some implementations, the mapping optimizer 199 may include code and routines that are operable to build a response to the query 192. The response may include an electronic message that includes electronic data describing the mapping solution 194. The mapping optimizer 199 may cause a processor of the mapping server 103 to transmit the response to the network 105.

In some implementations, the vehicle 123 may receive the response. For example, the vehicle 123 may receive the response from the network 105. The mapping client 190 or a processor-based computing device of the vehicle 123 (e.g., an onboard vehicle computer) may implement the mapping solution 194. For example, the mapping problem 193 may include a set of functions to be executed. The mapping solution 194 may describe which ECUs of the ECU set 171 should execute which functions of the set of functions. The mapping client 190 or the processor-based computing device of the vehicle 123 may map the individual functions of the set of functions to the ECUs of the ECU set 171 in accordance with the mapping solution 194. In this way, the mapping client 190 and the mapping optimizer 199 may form a mapping system that are operable to provide a mapping solution 194 to a vehicle 123 where the mapping solution 194 is determined by a cloud server (e.g., the mapping server 103) that is not an element of the vehicle 123 or local to the vehicle 123.

Figure 1B:
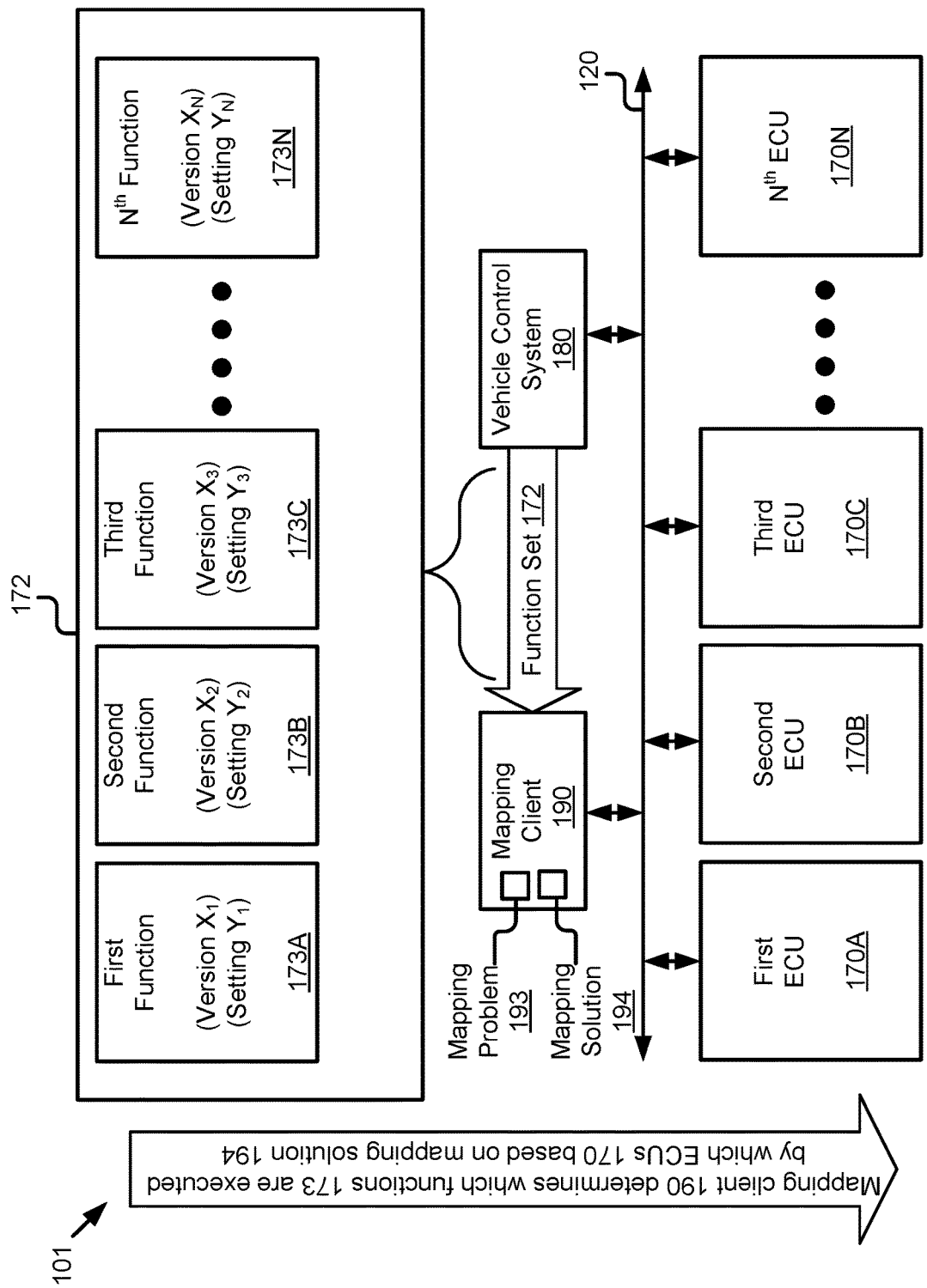
FIG. 1B is a block diagram illustrating a mapping of a set of functions to a set of ECUs according to some implementations.

An example of mapping a set of functions to an ECU set 171 based on a mapping solution 194 is depicted in FIG. 1B according to some implementations.

In some implementations, the mapping server 103 may be operated by an original equipment manufacturer ("OEM") associated with the vehicle 123. For example, the mapping server 103 is operated by an OEM of the ECU set 171. The mapping client 190 may include a thin client or some other software client that is operable by a processor-based computing device of the vehicle 123 to support the equipment of the OEM present in the vehicle 123 such as the ECU set 171.

In some implementations, the query 192 and the response may be encrypted themselves or transmitted via an encrypted communication provided by the network 105. In some implementations, the network 105 may include an encrypted virtual private network tunnel ("VPN tunnel"). In some implementations, the mapping optimizer 199 or the mapping client 190 may include encryption keys for encrypting messages and decrypting messages described herein.

In some implementations, the mapping server 103 may be operated by a manufacturer of the vehicle 123.

In some implementations, the mapping server 103 may be operated by a third-party that is trusted by the vehicle manufacturer or the OEM.

In some implementations, the mapping optimizer 199 may be implemented using hardware including a FPGA or an ASIC. In some other implementations, the mapping optimizer 199 may be implemented using a combination of hardware and software. The mapping optimizer 199 may be stored in a combination of the devices (e.g., servers or other devices), or in one of the devices.

In some implementations, the mapping server 103 may be an element of a roadside unit ("RSU").

In some implementations, the network 105 may include a Dedicated Short Range Communication ("DSRC") network and the vehicle 123 may transmit a query 192 to the mapping server 103 via a DSRC message and the mapping server 103 may transmit a response to the query 192 that includes the mapping solution 194 via a DSRC message.

In some implementations, the mapping server 103 and the vehicle 123 may each include a full-duplex coordination system as described in U.S. patent application Ser. No. 14/471,387 filed on Aug. 28, 2014 and entitled "Full-Duplex Coordination System," the entirety of which is herein incorporated by reference. For example, the mapping client 190 may include a full-duplex coordination system that transmits a full-duplex wireless message to the mapping server 103 that includes a mapping problem. The mapping optimizer 199 may include a full-duplex coordination system that transmits a full-duplex wireless message to the vehicle 123 that includes the mapping solution 194 that solves the mapping problem.

Referring now to FIG. 1B, a block diagram illustrating an example of a computer system 101 mapping a function set 172 to a plurality of ECUs 170A, 170B, 170C . . . 170N is depicted according to some implementations.

In some implementations, the computer system 101 may include a special-purpose computer system that is programmed to provide the functionality described herein. In some implementations, the computer system 101 may include the vehicle 123. In some implementations, the computer system 101 may include any processor-based computing device of the vehicle 123. For example, the computer system 101 may be an onboard vehicle computer of the vehicle 123.

The computer system 101 may include one or more of the following elements: the mapping client 190; the vehicle control system 180; and a plurality of ECUs 170A, 170B, 170C . . . 170N. These elements of the computer system 101 may be communicatively coupled to the bus 120.

The plurality of ECUs 170A, 170B, 170C . . . 170N may be elements of the ECU set 171 described above with reference to FIG. 1A. The "N" in "ECU 170N" may indicate that the ECU set 171 may include any positive whole number of ECUs 170A, 170B, 170C . . . 170N. The ECUs 170A, 170B, 170C . . . 170N may be referred to as "ECU 170" in the singular or "ECUs 170" collectively.

In some implementations, the vehicle control system 180 may generate a function set 172. The function set 172 may include a plurality of functions 173A, 173B, 173C . . . 173N. The "N" in "Function 173N" may indicate that the function set 172 may include any positive whole number of functions 173A, 173B, 173C . . . 173N. The functions 173A, 173B, 173C ... 173N may be referred to as "function 173" in the singular or "functions 173" collectively.

In some implementations, the mapping client 190 may determine a presence of a mapping problem 193 based on identifying a presence of the function set 172. For example, the function set 172 may include new functions not previously identified by the mapping client 190. The mapping problem 193 may include a question or lack of information regarding which of the ECUs 170 should execute the different functions 173 of the function set 172. For example, the mapping client 190 may not know one or more of the following: which of the ECUs 170 should execute the first function 173A; which of the ECUs 170 should execute the second function 173B; which of the ECUs 170 should execute the third function 173C; or which of the ECUs 170 should execute the Nth function 173N.

In some implementations, the mapping client 190 may generate a query including the mapping problem 193. The mapping problem 193 may include data that describes one or more of the following: (1) the function set 172; (2) a version associated with the function set 172; (3) a hardware platform associated with the function set 172; and (4) a setting associated with the hardware platform associated with the function set. The query is described in more detail below with reference to FIGS. 4A and 4B. The mapping client 190 may transmit the query to the network 105.

In some implementations, the mapping client 190 may receive a response to the query from the network. The response may be received in real time or substantially real time relative to the transmission of the query. In some implementations, the response is received within a period of 5 milliseconds and 1 minute of when the query is transmitted to the network 105. In some implementations, the response is received within 10 milliseconds of the query being transmitted to the network 105. In some implementations, the response is received within 1 second of the query being transmitted to the network 105. In some implementations, the response is received within 5 seconds of the query being transmitted to the network 105. In some implementations, the response is received within 1 minute of the query being transmitted to the network 105. In some implementations, the response is received within 5 minutes of the query being transmitted to the network 105.

The response may include the mapping solution 194. The mapping solution 194 may describe which of the ECUs 170 should execute which of the functions 173. The mapping client 190 may map a functions 173 to an ECU 170 based on the mapping solution 194. This process may be repeated for each of the functions 173 included in the function set 172.

In some implementations, the functions 173 are mapped to the ECUs 170 within a period of 5 milliseconds and 1 minute of when the query is transmitted to the network 105. In some implementations, the mapping is completed within 10 milliseconds of the query being transmitted to the network 105. In some implementations, the mapping is completed within 1 second of the query being transmitted to the network 105. In some implementations, the mapping is completed within 5 seconds of the query being transmitted to the network 105. In some implementations, the mapping is completed within 1 minute of the query being transmitted to the network 105. In some implementations, the mapping is completed within 5 minutes of the query being transmitted to the network 105.

Although not depicted in FIG. 1B, the computer system 101 may include one or more processors such as the processor 225 described below with reference to FIG. 2A. The processor may execute the mapping client 190 or the vehicle control system 180. The processor may control the operation of the mapping client 190 or the vehicle control system 180.

In some implementations, the computer system 101 may include a non-transitory memory such as the memory 227 or the storage 241 described below with reference to FIG. 2A. The non-transitory memory may store one or more of the following: the function set 172; digital data describing the mapping problem 193; digital data describing the mapping solution 194; the mapping client 190; and the vehicle control system 180.

In some implementations, the non-transitory memory may be accessible by the processor so that the processor may, for example, execute the mapping client 190 or the vehicle control system 180 or access the digital data describing the mapping problem 193 or the mapping solution 194.

In some implementations, the computer system 101 may include a communication unit such as the communication unit 245 described below with reference to FIG. 2A. For example, the computer system 101 may transmit the query including the mapping problem 193 to the network 105 via the communication unit and receive the response including the mapping solution 194 via the network 105.

Figure 2A:
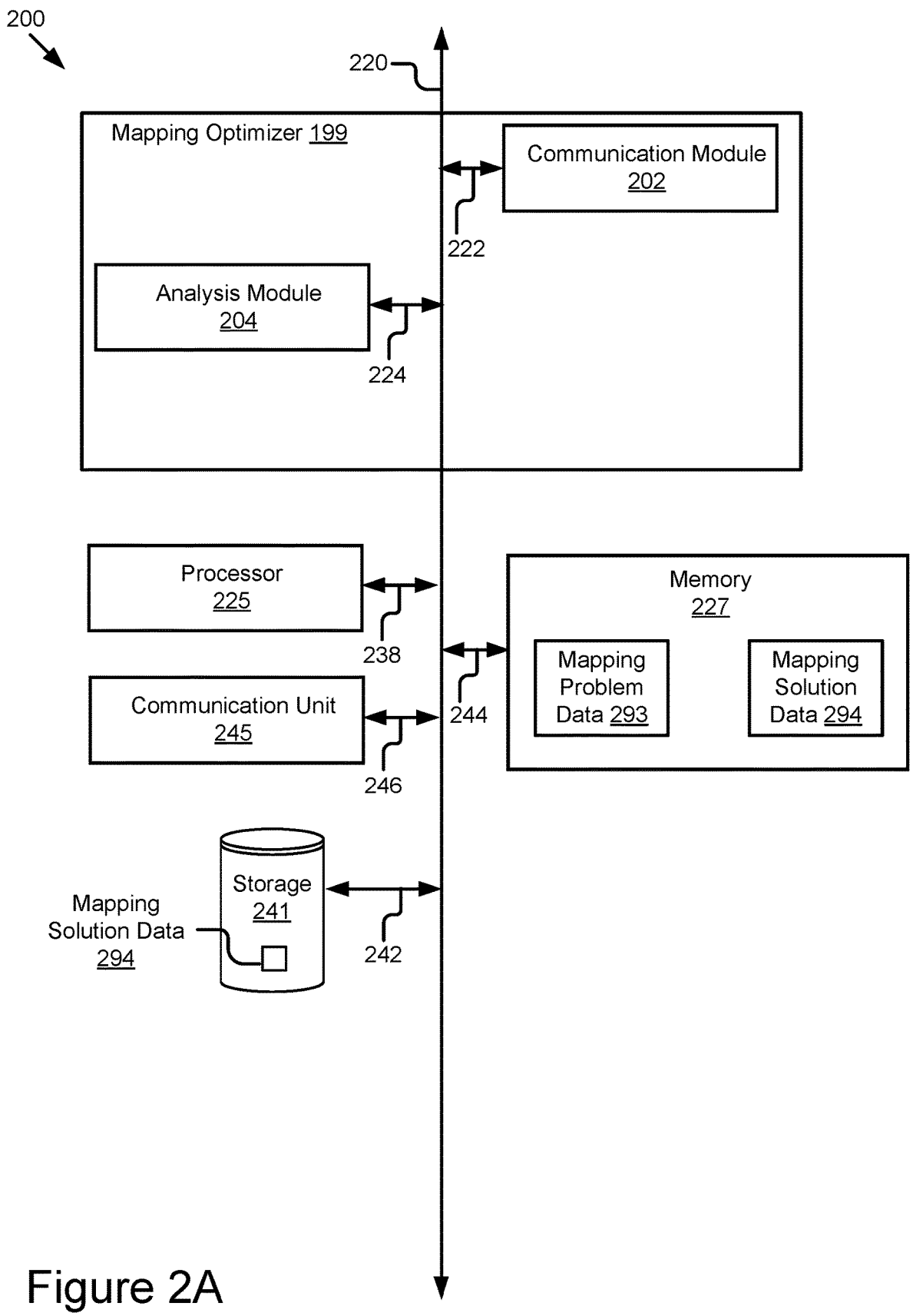
FIG. 2A is a block diagram illustrating an example computer system including a mapping optimizer according to some implementations.

Referring now to FIG. 2A, depicted is a block diagram illustrating an example computer system 200 including a mapping optimizer 199 according to some implementations.

In some implementations, the computer system 200 may include a special-purpose computer system that is programmed to perform one or more steps of a method 300 described below with reference to FIG. 3 or the method 499 described below with reference to FIG. 4B.

In some implementations, the computer system 200 may include the mapping server 103, a roadside unit or some other computing device that is operable to send and receive messages via the network 105, DSRC or full-duplex wireless messaging.

The computer system 200 may include one or more of the following elements according to some examples: the mapping optimizer 199; a processor 225; a communication unit 245; a storage 241; and a memory 227. The components of the computer system 200 are communicatively coupled by a bus 220.

In the illustrated implementation, the processor 225 is communicatively coupled to the bus 220 via a signal line 238. The communication unit 245 is communicatively coupled to the bus 220 via a signal line 246. The storage 241 is communicatively coupled to the bus 220 via a signal line 242. The memory 227 is communicatively coupled to the bus 220 via a signal line 244.

The processor 225 includes an arithmetic logic unit, a microprocessor, a general purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. Although FIG. 2A includes a single processor 225, multiple processors may be included. The processor 225 may include a graphical processing unit. Other processors, operating systems, sensors, displays, and physical configurations may be possible.

The memory 227 stores instructions or data that may be executed by the processor 225. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores one or more of the following elements: the mapping problem data 293; and the mapping solution data 294.

The mapping problem data 293 may include digital data that describes the mapping problem 193. The mapping problem data 293 may be included in a query 192 received from the network 105. The communication unit 245 may receive the query 192 from the network 105. The query 192 may be an electronic message encoded to include the mapping problem data 293.

The mapping solution data 294 may include digital data that describes the mapping solution 194. The mapping optimizer 199 may determine the mapping solution data 294 based on the mapping problem data 293. The mapping optimizer 199 may generate a response that includes the mapping solution data 294. The response may include an electronic message encoded to include the mapping solution data 294. The communication unit 245 may transmit the response to the network 105.

The communication unit 245 may include hardware that transmits and receives data to and from the network 105. In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the network 105 or other communication channels using one or more wireless communication methods, including IEEE 802.11, IEEE 802.16, Bluetooth, or another suitable wireless communication method.

In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the network 105 or other communication channels using one or more wireless communication methods, including: IEEE 802.11; IEEE 802.16, Bluetooth, EN ISO 14906:2004 Electronic Fee Collection—Application interface EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, millimeter wave, DSRC, etc.

In some implementations, the communication unit 245 includes full-duplex coordination system as described in U.S. patent application Ser. No. 14/471,387 filed on Aug. 28, 2014 and entitled "Full-Duplex Coordination System."

The storage 241 can be a non-transitory storage medium that stores data for providing the functionality described herein. The storage 241 may be a dynamic random access memory (DRAM) device, a static random access memory (SRAM) device, flash memory, or some other memory devices. In some implementations, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the storage 241 may include a cache storage (herein, a "cache"). The cache may store the mapping solution data 294. For example, the mapping optimizer 199 may determine a mapping solution 194 for a mapping problem 193 and store the mapping solution data 294 describing the mapping solution 194 in the cache. In this way, the mapping solution data 294 may be retrieved from the cache the next time the same or similar mapping problem 193 is received from a vehicle 123.

In the illustrated implementation shown in FIG. 2A, the mapping optimizer 199 includes a communication module 202 and an analysis module 204. These components of the mapping optimizer 199 are communicatively coupled to each other via the bus 220. In some implementations, components of the mapping optimizer 199 can be stored in a single server or device. In some other implementations, components of the mapping optimizer 199 can be distributed and stored across multiple servers or devices.

The communication module 202 can be software including routines for handling communications between the mapping optimizer 199 and other components of the computer system 200. In some implementations, the communication module 202 can be a set of instructions executable by the processor 225 to provide the functionality described below for handling communications between the mapping optimizer 199 and other components of the computer system 200. In some implementations, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the computer system 200 or the network 105. For example, the communication module 202 receives, via the communication unit 245, the mapping problem data 293. The communication module 202 may send the mapping solution data 294 to the network 105 via the communication unit 245.

In some implementations, the communication module 202 receives data from components of the mapping optimizer 199 and stores the data in one or more of the storage 241 and the memory 227. For example, the communication module 202 receives the mapping solution data 294 from the storage 241.

In some implementations, the communication module 202 may handle communications between components of the mapping optimizer 199 or the computer system 200.

In some implementations, the communication module 202 may include one or more of the following elements described below with reference to FIG. 2B: the input interface 250; and the output interface 252.

The analysis module 204 can be software including routines for analyzing one or more of the mapping problem data 293 and determining a mapping solution 194 to the mapping problem 193 described by the mapping problem data 293. The mapping solution 194 may be described by the mapping solution data 294.

In some implementations, the analysis module 204 may include one or more of the following elements described below with reference to FIG. 2B: the query processor 251; and the solver 248.

In some implementations, the analysis module 204 can be stored in the memory 227 of the computer system 200 and can be accessible and executable by the processor 225. The analysis module 204 may be adapted for cooperation and communication with the processor 225 and other components of the computer system 200 via signal line 224.

Figure 2B:
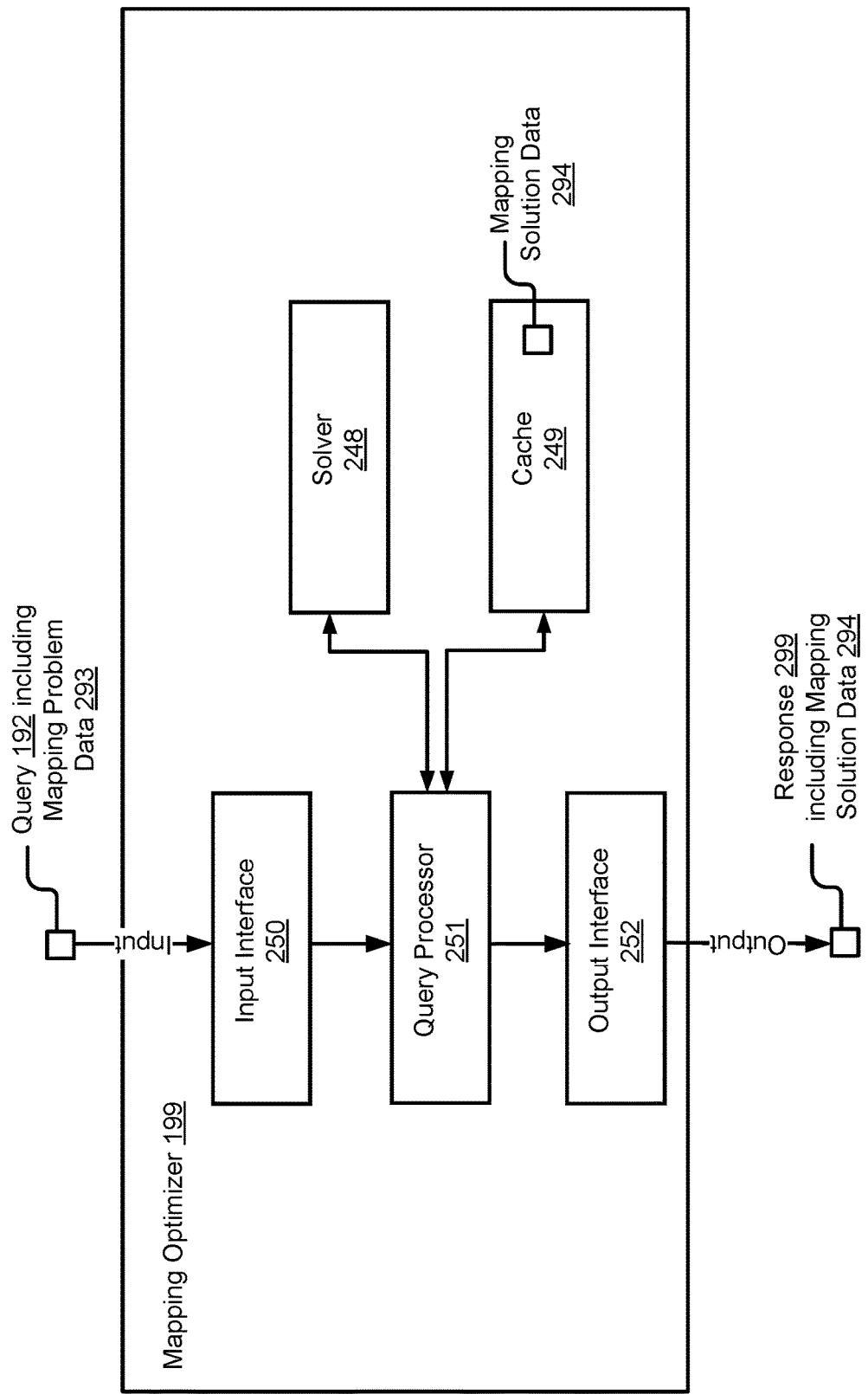
FIG. 2B is a block diagram illustrating an example architecture for the mapping optimizer according to some implementations.

Referring now to FIG. 2B, depicted is a block diagram illustrating an example architecture for the mapping optimizer 199 according to some implementations.

The mapping optimizer 199 may include one or more of the following elements: an input interface 250; a query processor 251; a solver 248; a cache 249; and an output interface 252.

The input interface 250 may include code and routines that are operable to cause a processor (such as the processor 225 described above for FIG. 2A) to receive one or more messages or other inputs. For example, the input interface 250 may receive an input from a bus (e.g., bus 120 or bus 220) or a network (e.g., network 105).

In some implementations, the input interface 250 may receive a query 192 that includes mapping problem data 293 that describes a mapping problem 193 associated with a vehicle 123.

In some implementations, the input interface 250 may be stored on a non-transitory memory such as the memory 227 or the storage 241 described above with reference to FIG. 2A.

In some implementations, the input interface 250 may include a hardware component that is hard wired to a main system network. The main system network may include a Controller Area Network (CAN) bus or an Ethernet switch.

In some implementations, the input interface 250 may include hardware such as a port or a receiver for a network. For example, the input interface 250 may include one or more of the following: a DSRC receiver, a Wi-Fi receiver, a Bluetooth receiver, a mobile network receiver, a full-duplex coordination system, etc.

In some implementations, the input interface 250 may include a combination of hardware and software.

In some implementations, the input interface 250 may be an element of the communication unit 245 or the communication module 202 described above for FIG. 2A.

The cache 249 may include a cache storage. For example, the cache 249 may include a non-transitory memory such as the storage 241 described above with reference to FIG. 2A. The cache 249 may store one or more sets of mapping solution data 294. Each set of mapping solution data 294 may solve one or more mapping problems 193.

The query processor 251 may include code and routines that are operable, when executed by the processor 225, to cause the processor 225 to analyze the mapping problem data 293 included in the query 192 and the mapping solution data 294 stored on the cache 249 to determine whether the mapping problem 193 described by the mapping problem data 293 has been solved before by the mapping optimizer 199.

For example, each pair of mapping problem data 293 and mapping solution data 294 may include one or more identifying bits of information that may indicate that they are associated with one another. The mapping client 190 may encode the query 192 so that the mapping problem data 293 or the query itself includes the one or more identifying bits. The mapping client 190 or the vehicle 123 may store a data structure such as a table that is accessible by the mapping client 190 to determine which identifying bits to encode in the query or the mapping problem data 293. The mapping optimizer 199 may include a non-transitory memory (such as the cache 249) that stores a copy of the same data structure or a similar data structure (e.g., the versions of the data structure may be different or one may be more comprehensive or include different data). The query processor 251 may cause the processor 225 to analyze the mapping solution data 294 stored on the cache 249 to determine whether it includes one or more bits that indicate that it forms a pair with the mapping problem data 293 or is otherwise associated with the mapping problem data 293 (i.e., it solves the mapping problem). For example, the mapping solution data 294 may solve two or more mapping problems and the identifying bits may indicate that the mapping solution data 294 is a solution to the mapping problem 193 described by the mapping problem data 293.

The query processor 251 may determine that the cache 249 does not store a set of mapping solution data 294 that solves the mapping problem 193 described by the mapping problem data 293. In this situation, the query processor 251 may call the solver 248. The solver 248 may include code and routines that are operable, when executed by the processor 225, to cause the processor 225 to analyze the mapping problem data 293 and solve the mapping problem 193 described by the mapping problem data 293.

In some implementations, the solver 248 or the query processor 251 may cause the processor 225 to store the mapping solution data 294 that solves the mapping problem 193 in the cache 249. In this way the mapping solution 194 for the mapping problem 193 may be retrieved quicker in the future relative to solving the mapping problem 193 by the solver 248. In some implementations, the cache 249 may be full and the solver 248 or the query processor 251 may cause the processor 225 to delete some of the data stored on the cache 249 so that the mapping solution data 294 may be stored on the cache 249. For example, heuristics may be applied such as removing the oldest mapping solution 194, removing the least used or accessed mapping solution 194 or some combination of these heuristics or other heuristics.

The output interface 252 may include code and routines that are operable to cause a processor (such as the processor 225 described above for FIG. 2A) to transmit a message or data to another element or device. For example, the output interface 252 may transmit a response 299 that includes the mapping solution data 294 that solves the mapping problem 193 described by the mapping problem data 293 received in the query 192.

In some implementations, the output interface 252 may be stored on a non-transitory memory such as the memory 227 or the storage 241 described above with reference to FIG. 2A.

In some implementations, the output interface 252 may include hardware such as a port or transceiver.

In some implementations, the output interface 252 may include a combination of hardware and software.

In some implementations, the output interface 252 may be an element of the communication unit 245 or the communication module 202 described above for FIG. 2A.

Figure 3:
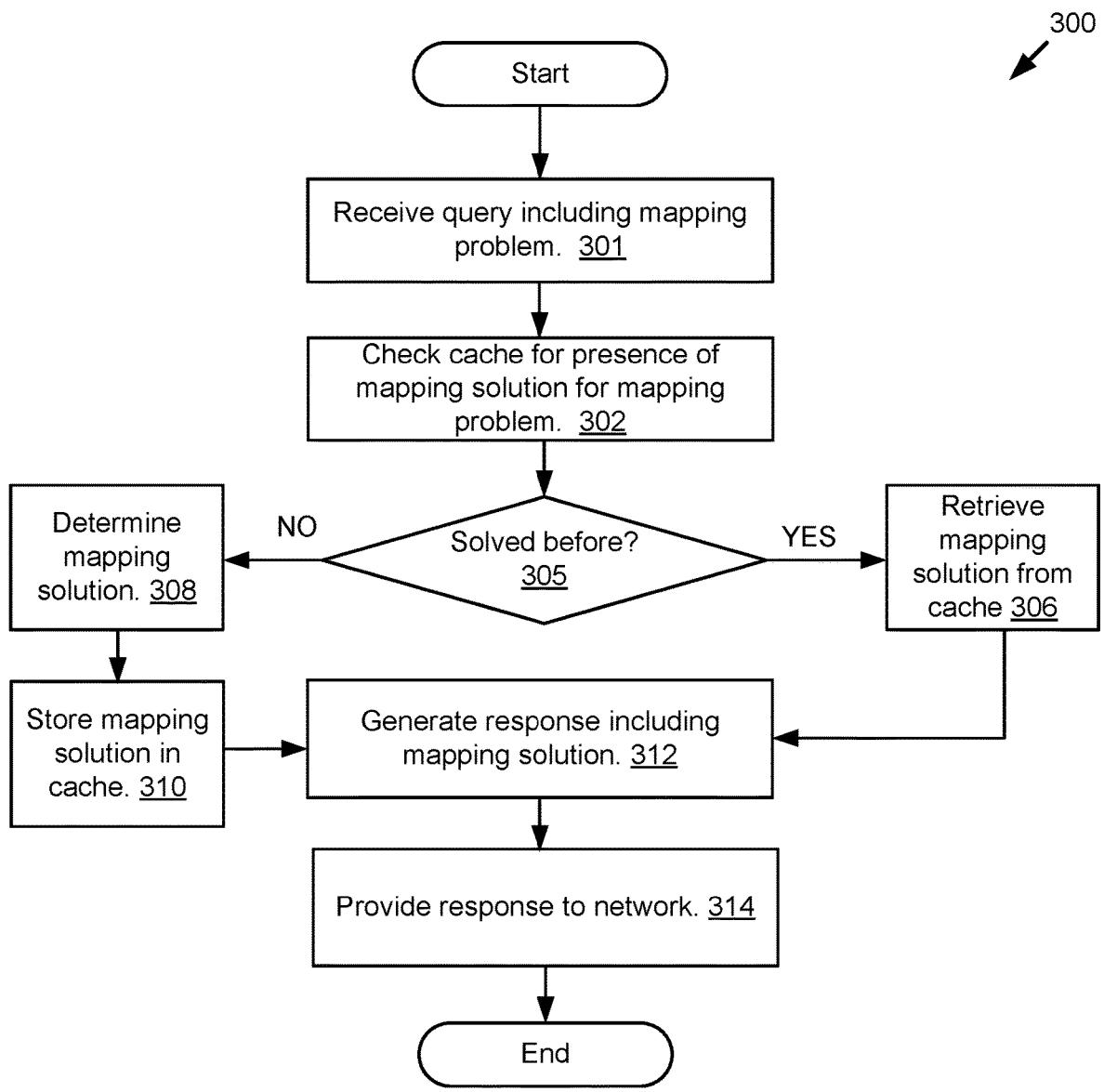
FIG. 3 is a flowchart of an example method for determining a mapping solution according to some implementations.

Referring now to FIG. 3, depicted is a flowchart of an example method 300 for determining a mapping solution 194 according to some implementations. One or more of the steps described herein for the method 300 may be executed by a mapping optimizer.

At step 301, a query may be received. The query may include mapping problem data that describes a mapping problem. The query may be received from a network.

At step 302, a cache may be checked for the presence of mapping solution data that describes a mapping solution for the mapping problem.

At step 305, a determination may be made regarding whether the cache includes a mapping solution for the mapping problem.

If the cache includes a mapping solution for the mapping problem at step 305, the method proceeds to step 306. At step 306, a mapping solution data describing the mapping solution for the mapping problem may be retrieved from the cache and the method 300 proceeds to step 312.

If the cache does not include a mapping solution for the mapping problem at step 305, the method proceeds to step 308. At step 308, a mapping solution for the mapping problem may be determined. At step 310 mapping solution data describing the mapping problem may be stored in the cache. The method 300 proceeds to step 312.

At step 312, a response may be generated that includes the mapping solution data.

At step 314, the response may be provided to the network.

Figure 4A:
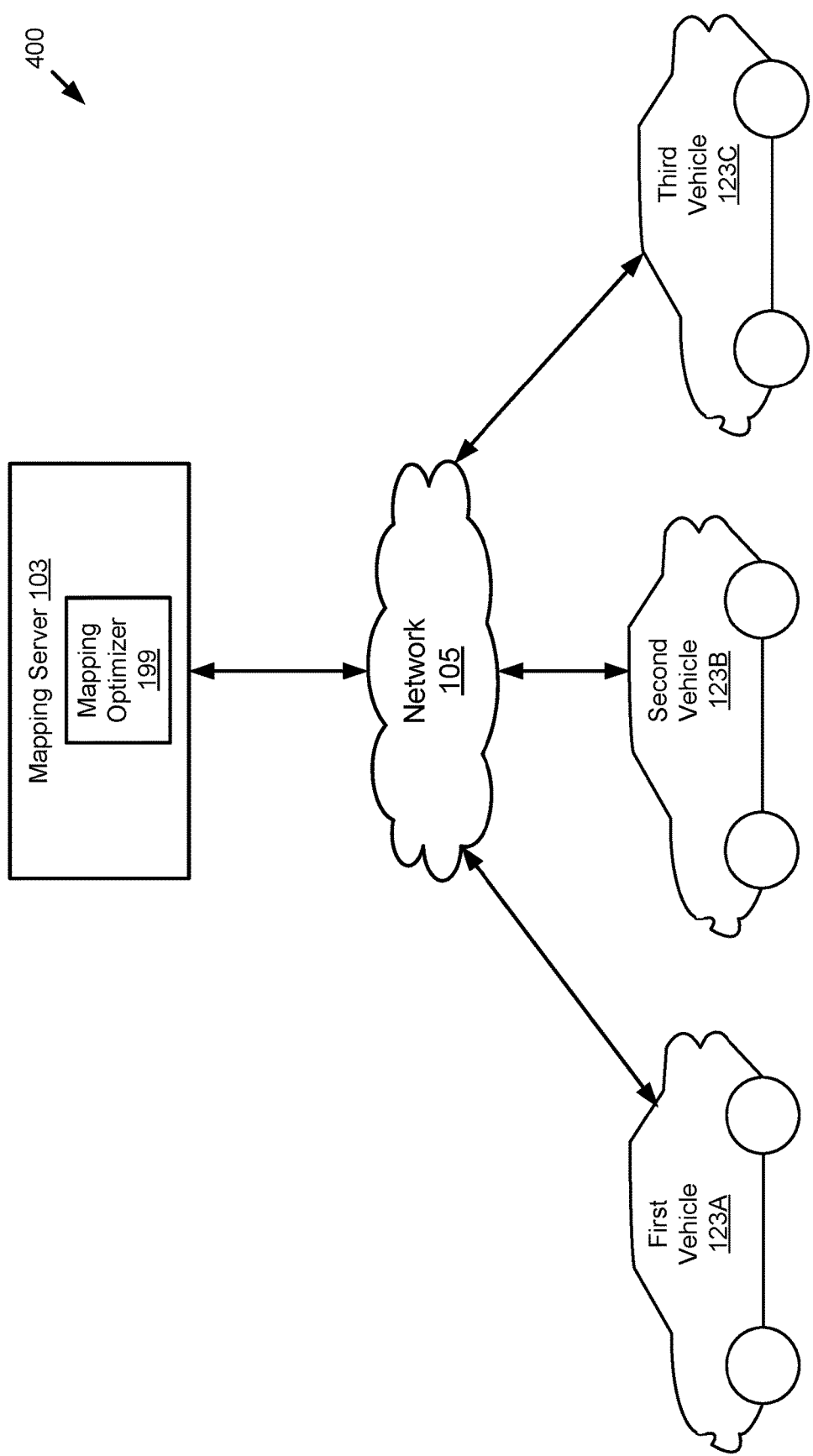
FIG. 4A is a block diagram illustrating an example operating environment for an example use case for the mapping optimizer according to some implementations.

Referring now to FIG. 4A, depicted is a block diagram illustrating an example operating environment for a use case for the mapping optimizer 199 according to some implementations. FIGS. 4A and 4B may be read together. For example, FIG. 4B includes a flowchart of an example method 499 for the example use case of FIG. 4A according to some implementations.

Referring now to FIG. 4A, the operating environment 400 includes the following elements: the mapping server 103 including the mapping optimizer 199; a first vehicle 123A; a second vehicle 123B; and a third vehicle 123C. These elements are communicatively coupled to the network 105. The first vehicle 123A, the second vehicle 123B and the third vehicle 123C may include elements similar to the vehicle 123, and so, these descriptions will not be repeated here.

The operating environment 400 is discussed below with reference to the method 499 of FIG. 4B.

Figure 4B:
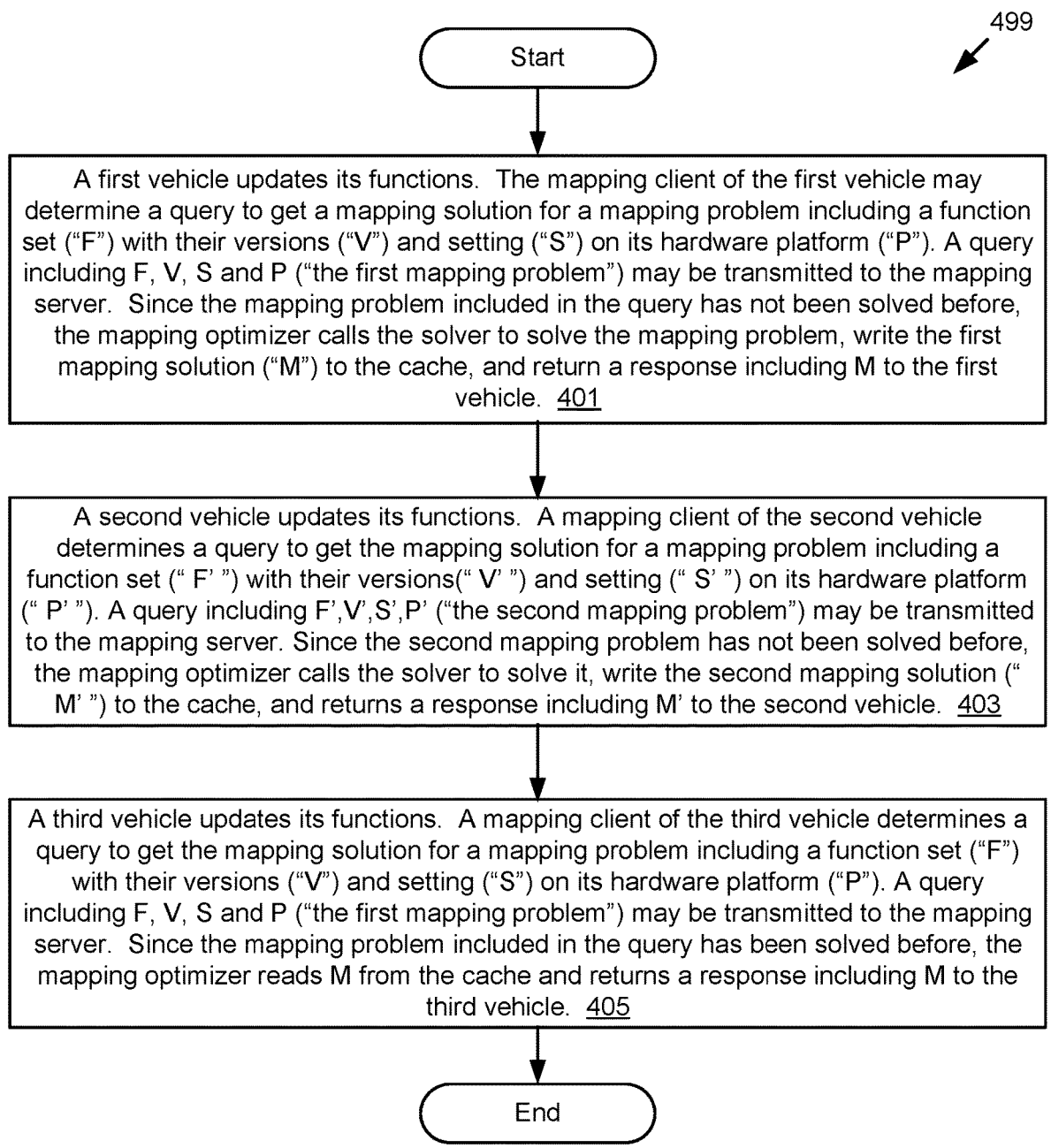
FIG. 4B is a flowchart of an example method for the example use case of FIG. 4A according to some implementations.

Referring now to FIG. 4B, at step 401 a first vehicle 123 updates its functions. The mapping client of the first vehicle may determine a query to get a mapping solution for a mapping problem including a function set ("F") with their versions ("V") and setting ("S") on its hardware platform ("P"). A query including F, V, S and P ("the first mapping problem") may be transmitted to the mapping server. Since the mapping problem included in the query has not been solved before, the mapping optimizer calls the solver to solve the mapping problem, write the first mapping solution ("M") to the cache, and return a response including M to the first vehicle.

At step 403, a second vehicle updates its functions. A mapping client of the second vehicle determines a query to get the mapping solution for a mapping problem including a function set ("F'") with their versions ("V'") and setting ("S'") on its hardware platform ("P'"). A query including F', V', S', P' ("the second mapping problem") may be transmitted to the mapping server. Since the second mapping problem has not been solved before, the mapping optimizer calls the solver to solve it, write the second mapping solution ("M'") to the cache, and returns a response including M' to the second vehicle.

At step 405, a third vehicle updates its functions. A mapping client of the third vehicle determines a query to get the mapping solution for a mapping problem including a function set ("F") with their versions ("V") and setting ("S") on its hardware platform ("P"). A query including F, V, S and P ("the first mapping problem") may be transmitted to the mapping server. Since the mapping problem included in the query has been solved before, the mapping optimizer reads M from the cache and returns a response including M to the third vehicle.

Referring now to FIG. 1A, one or more of the following devices may be a communication device: a vehicle 123; a mapping server 103. Regarding U.S. patent application Ser. No. 14/471,387 filed on Aug. 28, 2014 and entitled "Full-Duplex Coordination System," in a half-duplex communication system, a first communication device currently transmitting data to a second communication device is not capable of simultaneously receiving data from the second communication device. If the second communication device has data to transmit to the first communication device, the second communication device needs to wait until the first communication device completes its data transmission. Only one communication device is allowed to transmit data at one time in the half-duplex communication system.

In a standard IEEE 802.11 Wireless Local Area Network (WLAN), communication devices may compete for access to a wireless channel based on the Carrier Sense Multiple Access with Collision Avoidance (CSMA/CA) Medium Access Control (MAC) protocol. The IEEE 802.11 MAC protocol requires that only one communication device may use the wireless channel to transmit data at one time. If two or more communication devices transmit data over the wireless channel at the same time, a collision occurs. As a result, only the communication device that currently gains access to the wireless channel may use the wireless channel to transmit data. Other communication devices having data to transmit need to monitor the wireless channel and may compete for access to the wireless channel when the wireless channel becomes idle again.

According to one innovative aspect of the subject matter described in this disclosure, the vehicle 123, the mapping server 103 (and other communication devices as described above) may include a full duplex coordination system for implementing full-duplex wireless communications. The full duplex coordination system may include a processor and a memory storing instructions that, when executed, cause the full duplex coordination system to: create, at a first communication device (such as a vehicle 123, etc.), first data (such as a query 192 including mapping problem data 293) to transmit to a second communication device (such as a mapping server 103, etc.); switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data (such as any combination of the data stored on the memory 227) from the second communication device using the wireless channel.

According to another innovative aspect of the subject matter described in this disclosure, a full duplex coordination system for implementing full-duplex wireless communications includes a processor and a memory storing instructions that, when executed, cause the full duplex coordination system to: receive a first portion of first data (such as any combination of the data stored on the memory 227) from a first communication device via a wireless channel; determine that a second communication device is a single destination of the first data based on the first portion of the first data; determine that the second communication device has second data (such as any combination of the data stored on the memory 227) to transmit to the first communication device; determine that the first communication device has full-duplex communication capability; switch a half-duplex operation mode of the second communication device to a full-duplex operation mode to activate the full-duplex operation mode of the second communication device; and transmit, in the full-duplex operation mode of the second communication device, the second data to the first communication device while simultaneously receiving a remaining portion of the first data from the first communication device using the wireless channel.

In general, another innovative aspect of the subject matter described in this disclosure may be embodied in methods that include: creating, at a first communication device, first data to transmit to a second communication device; switching a half-duplex operation mode of the first communication device to a full-duplex operation mode to activate the full-duplex operation mode of the first communication device; transmitting a first portion of the first data from the first communication device to the second communication device using a wireless channel; and transmitting, in the full-duplex operation mode of the first communication device, a remaining portion of the first data to the second communication device while simultaneously receiving second data from the second communication device using the wireless channel.

Yet another innovative aspect of the subject matter described in this disclosure may be embodied in methods that include: receiving a first portion of first data from a first communication device via a wireless channel; determining that a second communication device is a single destination of the first data based on the first portion of the first data; determining that the second communication device has second data to transmit to the first communication device; determining that the first communication device has full-duplex communication capability; switching a half-duplex operation mode of the second communication device to a full-duplex operation mode to activate the full-duplex operation mode of the second communication device; and transmitting, in the full-duplex operation mode of the second communication device, the second data to the first communication device while simultaneously receiving a remaining portion of the first data from the first communication device using the wireless channel.

Another innovative aspect of the subject matter described in this disclosure may be embodied in methods that include: determining first data to transmit from a first communication device to a second communication device; and transmitting, from the first communication device that operates in a full-duplex operation mode, the first data to the second communication device while simultaneously receiving second data from the second communication device using a common wireless channel.

Another innovative aspect of the subject matter described in this disclosure may be embodied in methods that include: receiving, from a first communication device, first data at a second communication device via a wireless channel; determining second data to transmit from the second communication device to the first communication device responsive to receiving at least a portion of the first data; and transmitting, from the second communication device that operates in a full-duplex operation mode, the second data to the first communication device using the wireless channel while simultaneously receiving the first data from the first communication device.

Another innovative aspect of the subject matter described in this disclosure may be embodied in methods that include: determining, at a first communication device, first data to transmit to a second communication device; switching the first communication device from a half-duplex operation mode to a full-duplex operation mode; transmitting, in the full-duplex operation mode of the first communication device, the first data to the second communication device while simultaneously receiving second data from the second communication device using the wireless channel; and switching the full-duplex operation mode of the first communication device to the half-duplex operation mode responsive to a determination that transmission of the first data completes.

Another innovative aspect of the subject matter described in this disclosure may be embodied in methods that include: receiving, from a first communication device, first data at a second communication device via a wireless channel; determining that the second communication device has second data to transmit to the first communication device; switching the second communication device from a half-duplex operation mode to a full-duplex operation mode; transmitting, in the full-duplex operation mode of the second communication device, the second data to the first communication device while simultaneously receiving the first data from the first communication device using the wireless channel; and switching the full-duplex operation mode of the second communication device to the half-duplex operation mode responsive to a determination that transmission of the second data completes.

Other aspects include corresponding methods, systems, apparatus, and computer program products for these and other innovative aspects.

These and other implementations may each optionally include one or more of the following operations and features. For instance, the features include: the first data including a first packet and the first portion of the first data including a header portion of the first packet; the remaining portion of the first data including a payload portion and a trailer portion of the first packet; determining that the second communication device is a single destination of the first data; activating the full-duplex operation mode of the first communication device responsive to the second communication device being the single destination of the first data; the first communication device and the second communication device being communication devices in a wireless local area network; determining that the first communication device operates in a regulated spectrum where full-duplex communication capability is required; receiving device registry data associated with the first communication device; determining that the first communication device has full-duplex communication capability based on the device registry data; and determining that the first communication device has full-duplex communication capability based on a capability indication field in the first portion of the first data, the capability indication field including data describing whether the first communication device has full-duplex communication capability.

For instance, the operations include: determining that the wireless channel is idle; and accessing the wireless channel for data communication between the first communication device and the second communication device based on a channel access rule.

The disclosure is particularly advantageous in a number of respects. For example, the system described herein is capable of achieving a higher throughput and a faster communication speed using full-duplex communication technologies rather than using half-duplex communication technologies. The full-duplex communication may be implemented between vehicles (e.g., communication systems installed in a vehicle 123 such as is depicted in FIG. 1A) or other communication devices that have full-duplex communication capability. In another example, the system coordinates communication between communication devices in a distributed way without using a central coordinator. The system determines a pair of communication devices and coordinates simultaneous transmission of data between the pair of communication devices so that the pair of communication devices may transmit data to each other simultaneously using the same wireless channel. Meanwhile, other communication devices may not transmit data over the wireless channel to avoid collision. The advantages of the system described herein are provided by way of example, and the system may have numerous other advantages.

The disclosure includes a system and method for implementing full-duplex wireless communications between communication devices. A full-duplex coordination system may include a processor and a memory storing instructions that, when executed, cause the full-duplex coordination system to: create, at a first communication device, first data to transmit to a second communication device; switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data from the second communication device using the wireless channel.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computer system that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A system comprising:
    a mapping optimizer of a mapping server that is operable to:
        receive a query from a vehicle, the query including mapping problem data describing a mapping problem that asks which electronic control unit (ECU) from a set of ECUs is to execute one or more functions associated with a version responsive to a modification of the one or more functions;
        determine that the mapping problem was previously solved for the version associated with the one or more functions based on mapping solution data being stored in a cache;
        retrieve the mapping solution data from the cache; and
        generate a response that includes the mapping solution data that describes which ECU executes the one or more functions that make the vehicle autonomous.

2. The system of claim 1, wherein the vehicle is a first vehicle, the query is a first query, and the mapping optimizer is further operable to:
    before receiving the first query, receive a second query from a second vehicle, the second query including the mapping problem data that asks which ECU from the set of ECUs is to execute the one or more functions associated with the version responsive to the modification of the one or more functions;
    determine that the mapping problem was not previously solved for the version associated with the one or more functions based on a lack of the mapping solution data being stored in the cache;
    generate the mapping solution data; and
    store the mapping solution data in the cache.

3. A system comprising:
    a vehicle comprising:
        a vehicle control system that is operable to modify one or more functions; and
        a mapping client that is operable to, responsive to a modification of the one or more functions, generate a query including mapping problem data describing a mapping problem that asks which electronic control unit (ECU) from a set of ECUs is to execute the one or more functions associated with a version responsive to the modification of the one or more functions; and
    a mapping optimizer of a mapping server that is operable to:
        receive the query including the mapping problem data;
        determine that the mapping problem was previously solved for the version associated with the one or more functions based on mapping solution data being stored in a cache;
        retrieve the mapping solution data from the cache; and
        generate a response that includes the mapping solution data that describes which ECU executes the one or more functions that make the vehicle autonomous.

4. The system of claim 3, wherein the mapping problem data in the query includes a function set with a setting on a hardware platform.

5. The system of claim 3, wherein the vehicle control system includes software and hardware that makes the vehicle an Advanced Driver Assistance System and the Advanced Driver Assistance System includes one or more of an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system;
  an intersection assistance system; an intelligent speed adaption system; a lane departure warning system; a pedestrian protection system; a traffic sign recognition system; a turning assistant; and
  a wrong-way driving warning system.

6. The system of claim 3, wherein the mapping server is an element of a roadside unit.

7. The system of claim 3, wherein the response is received by the mapping client between 5 milliseconds and one minute relative to when the query was transmitted to a network by the mapping client.

8. The system of claim 3, wherein the one or more functions include a plurality of functions and the mapping solution data further describes that the first ECU is to execute a first function from the plurality of functions and a second ECU is to execute a second function from the plurality of functions.

9. The system of claim 3, wherein the vehicle is a first vehicle, the query is a first query, and the mapping problem was previously solved for a second vehicle that submitted a second query with the one or more functions and the version.

10. The system of claim 3, wherein the vehicle control system makes the vehicle autonomous by applying the one or more functions to a hardware vehicle component based on mapping the first ECU to the one or more functions.

11. A computer program product comprising a non-transitory memory of a vehicle storing computer-executable code that, when executed by a processor of the vehicle, causes the processor to:
  identify a modification to one or more functions associated with a vehicle control system;
  responsive to the modification of the one or more functions, generate a query including mapping problem data describing a mapping problem that asks which electronic control unit (ECU) from a set of ECUs is to execute the one or more functions associated with a version responsive to the modification of the one or more functions; and
  receive a response that includes mapping solution data describing which ECU executes the one or more functions that make the vehicle autonomous , wherein the mapping problem was previously solved for the version associated with the one or more functions as determined based on the mapping solution data being stored in a cache.

12. The computer program product of claim 11, wherein the modification to the one or more functions is an update to the version.

13. The computer program product of claim 11, wherein the mapping problem data in the query includes a function set with a setting on a hardware platform.

14. The computer program product of claim 11, wherein the one or more functions include a plurality of functions and the mapping solution data further describes that the first ECU is to execute a first function from the plurality of functions and a second ECU is to execute a second function from the plurality of functions.

15. The computer program product of claim 11, wherein the response is received by the vehicle between 5 milliseconds and one minute relative to when the query was transmitted to a network.

16. The computer program product of claim 11, wherein the response is received by the vehicle in real time relative to when the modification to the one or more functions associated with the vehicle control system were identified.

17. A method of a vehicle comprising:
  identifying a modification to one or more functions associated with a vehicle control system;
  responsive to the modification of the one or more functions, generating, by a processor of an onboard vehicle computer of the vehicle, a query including mapping problem data describing a mapping problem that asks which electronic control unit (ECU) from a set of ECUs is to execute the one or more functions associated with a version responsive to the modification of the one or more functions; and
  receiving a response that includes mapping solution data describing which ECU executes the one or more functions that make the vehicle autonomous, wherein the mapping problem was previously solved for the version associated with the one or more functions as determined based on the mapping solution data being stored in a cache.

18. The method of claim 17, wherein the response including the mapping solution data is transmitted to the vehicle by a server that is communicatively coupled to a network.

19. The method of claim 17, wherein the mapping problem data in the query includes a function set with a setting on a hardware platform.

20. The method of claim 17, wherein the one or more functions include a plurality of functions and the mapping solution data further describes that the first ECU is to execute a first function from the plurality of functions and a second ECU is to execute a second function from the plurality of functions.

* * * * *